D. BRANDENSTEIN & J. FISCHER.
POWER TRANSMISSION FOR SEWING MACHINES.
APPLICATION FILED DEC. 11, 1916.
1,292,239.
Patented Jan. 21, 1919.
3 SHEETS—SHEET 1.
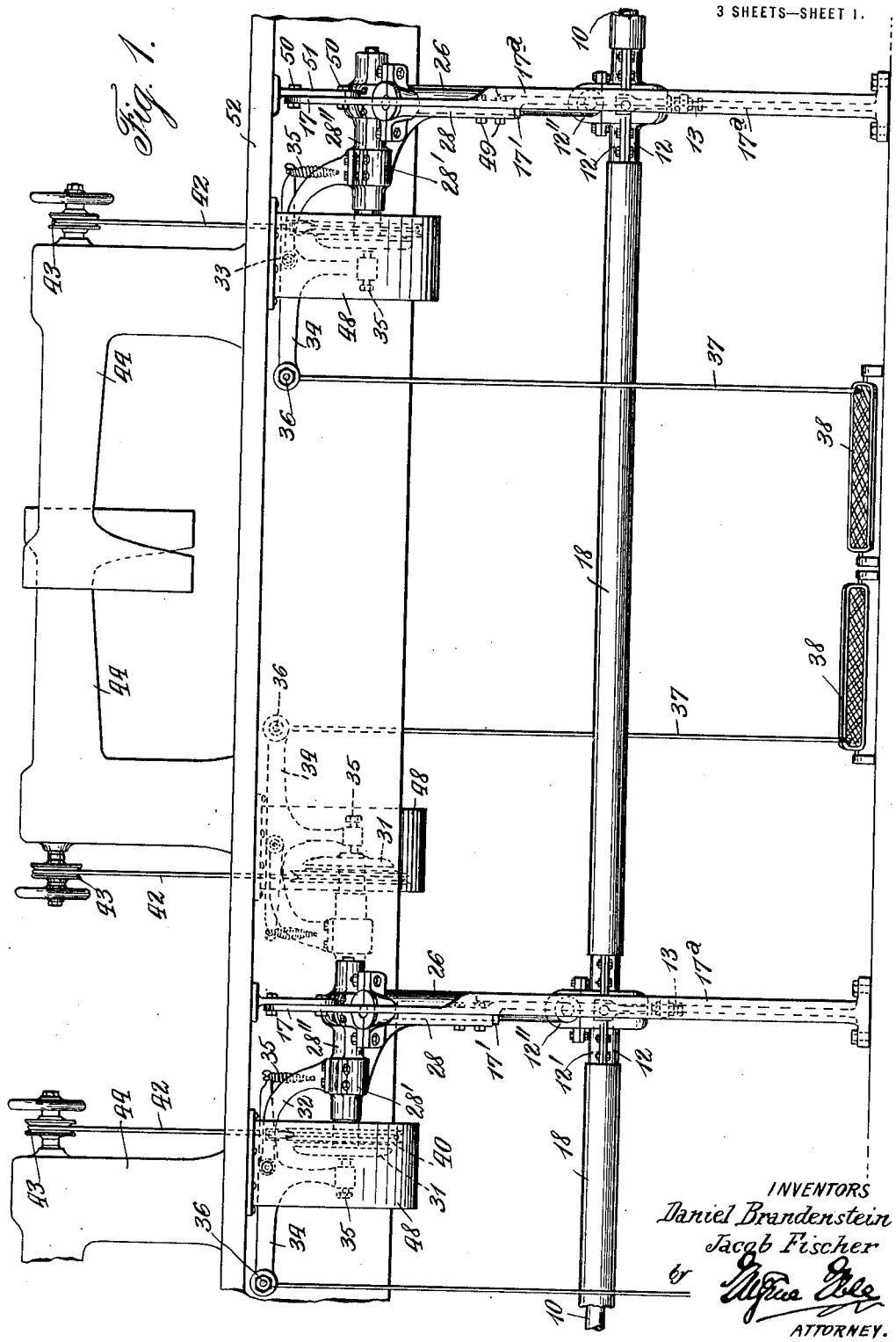
INVENTORS
Daniel Brandenstein
Jacob Fischer
by
ATTORNEY.

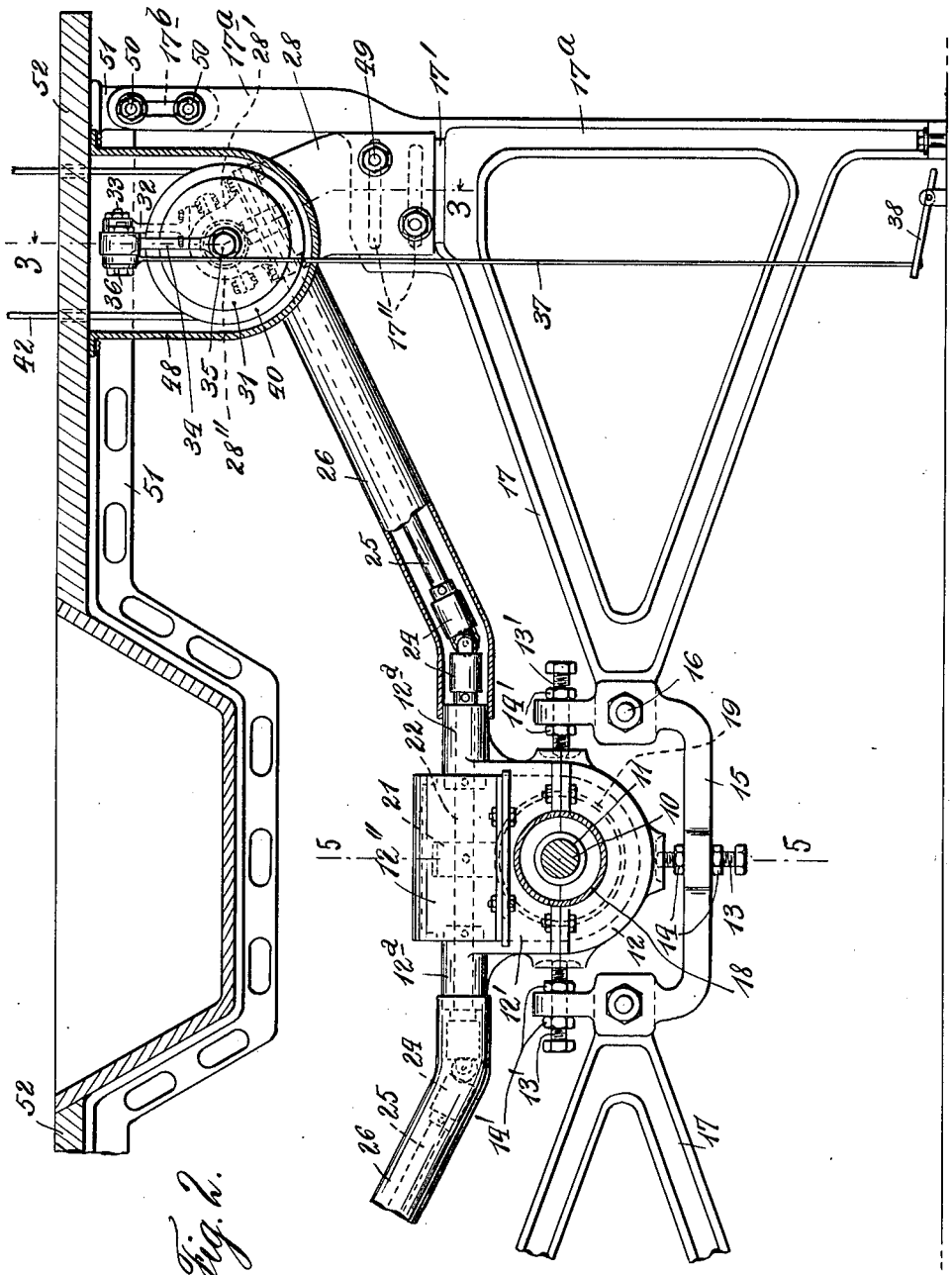

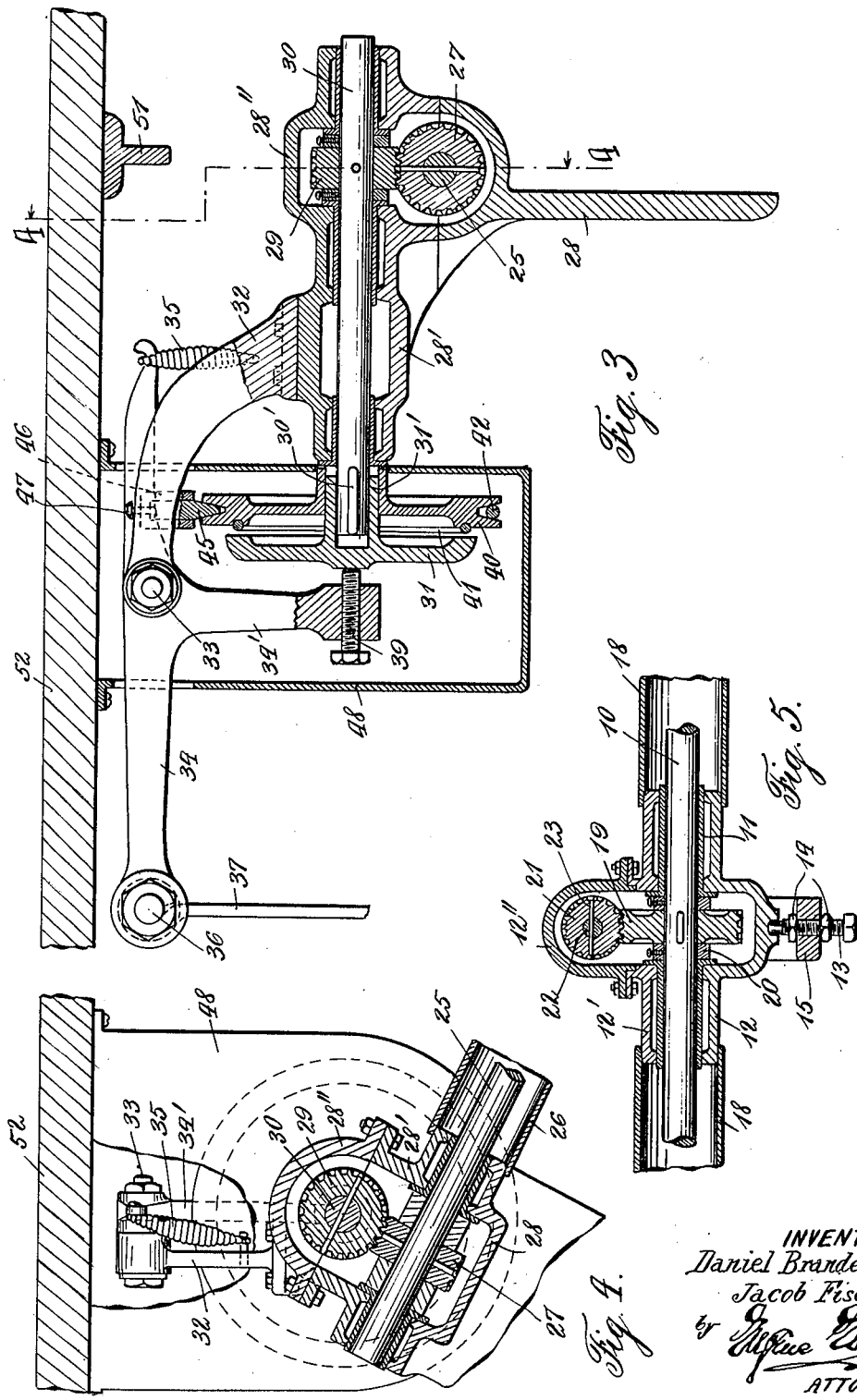

UNITED STATES PATENT OFFICE.

DANIEL BRANDENSTEIN, OF NEW YORK, N. Y., AND JACOB FISCHER, OF ROSEVILLE, NEW JERSEY.

POWER TRANSMISSION FOR SEWING-MACHINES.

1,292,239.  Specification of Letters Patent.  Patented Jan. 21, 1919.

Application filed December 11, 1916. Serial No. 136,255.

*To all whom it may concern:*

Be it known that we, DANIEL BRANDENSTEIN, a citizen of the United States, and a resident of the borough of Manhattan, city, county, and State of New York, and JACOB FISCHER, a citizen of the United States, and a resident of Roseville, Essex county, State of New Jersey, have jointly invented certain new and useful Improvements in Power Transmissions for Sewing-Machines, of which the following is a description.

Our invention relates to power-transmissions for operating sewing machines and the like, and has for its object to provide an improved mechanism of this character which will be simple and safe in its operation, readily kept clean, compactly arranged, and so placed as to give the operator freedom of movement and to allow the floor under the machines to be swept without difficulty.

For this purpose, we have devised a novel construction of which the accompanying drawings illustrate the preferred embodiment; this we shall now proceed to describe in detail, and then the characteristic features of our invention will be pointed out in the appended claims.

In the accompanying drawings, Figure 1 is a front elevation of a set of sewing machines provided with our improved drive; Fig. 2 is a partial vertical section, on an enlarged scale, in a plane at right angles to that of Fig. 1; Fig. 3 is a detail vertical section, substantially on line 3—3 of Fig. 2; and Figs. 4 and 5 are vertical sections on line 4—4 of Fig. 3 and 5—5 of Fig. 2 respectively.

The horizontal main shaft or power shaft 10, driven in any suitable manner, is journaled in bushings 11 of well-known character, supported by two-part bearings 12, 12'. The lower member 12 of each bearing rests on a screw-bolt 13, which after being adjusted up or down to the proper height, is locked against movement by means of nuts 14 engaging a stationary U-shaped bracket or bow 15. Similar horizontal screw-bolts 13', held, after adjustment, by means of nuts 14', serve to center or position the bearing 12, 12' to bring it into proper relation to the shaft 10. The inner ends of the bolts 13, 13' engage sockets in the bearing which are elongated transversely of the respective bolts, so as to provide for the ready adjustment, both vertically and laterally. The bracket or bow 15 carrying the bolts 13, 13' is secured, as by means of bolts and nuts 16, to V-shaped brackets 17 forming part of, or projected laterally from, legs 17$^a$, the brackets being arranged in pairs, the two brackets of the same pair being in the same plane, transverse to the shaft 10, and this also is substantially the plane of the U-shaped bow or carrier 15. With this arrangement, there is no need of a very accurate placing of the several legs 17$^a$, since the screws 13, 13' can always be adjusted to a proper engagement with the respective bearings 12, 12'. In order to cover the portions of the shaft 10 outside the bushings 11, we may inclose these portions in stationary sleeves 18 supported on the bearings 12, 12', see Fig. 5. Increased safety is thus insured, since the rotary parts are not exposed.

Within each of the bearings 12, 12', a gear wheel (skew gear) 19 is secured to the shaft 10 so as to be compelled to rotate therewith, and preferably collars 20 are secured to the shaft within the bearing, at each side of the wheel 19 and between the bushings 11, to prevent longitudinal motion. The gear wheel 19 is in mesh with a similar wheel 21 carried by a short horizontal shaft 22 arranged above the shaft 10 and in right-angled skew relation thereto. The shaft 22 is journaled in alining bearings 12$^a$ carried by the upper bearing member 12'. The latter is made with an opening normally closed by a cover 12'', the latter being bolted to the upper bearing member, and a similar connection is employed between the upper bearing member 12' and the lower bearing member 12, see Fig. 2. The gear wheel 21 is compelled by suitable means, such as the pin 23 (Fig. 5) to rotate with the shaft 22. The ends of this shaft are connected by universal joints or couplings 24 (Fig. 2) with inclined shafts 25, preferably inclosed in stationary protecting sleeves 26. The upper ends of the shafts 25 carry (skew) gear wheels 27 and are journaled in bearings 28, 28', resting at the bottom on horizontal flanges or shelves 17' projected laterally from the legs 17 (Figs. 1 and 2). The lower bearing member 28 is bolted to the upper bearing member 28', as indicated in Fig. 2, and this upper bearing member of the shaft 25 constitutes at the same time the lower bearing member for a shaft 30 carrying a (skew) gear 29 in mesh with the gear 27, a bearing cap 28″ being bolted to the member 28′ as shown in Figs. 2 and 4. As will be seen in Figs. 1 and 2, the inclined shafts 25, the horizontal shaft 22 connecting them, and other parts associated therewith, are located within the same vertical planes as the legs 17ª and their brackets 17, thus placing these parts where they will form the least obstruction. On the projecting end of the shaft 30 is mounted to slide, yet held to turn therewith, as by a feather 30′, a sleeve 31′ provided with a head or disk 31.

To the bearing cap 28″ is secured an arm or bracket 32 on which is fulcrumed at 33 a lever 34 under the influence of a spring 35. At 36 this lever is connected by a rod, wire or other suitable means 37 with a pedal 38 to be pressed by the operator. As will be understood from Fig. 1, the pedal connections are alternately at opposite sides of the machine; thus, at the extreme left of Fig. 1, the lever 34 is at the front of the machine; the second lever 34, adjacent to the same set of legs 17ª, is on the opposite side of said set of legs and at the rear of the machine, the left-hand pedal of Fig. 1 being therefore at the rear of the machine, while the right-hand pedal is at the front. Each operator is thus given ample space. The two clutches 31, shown at the left in Fig. 1 on the opposite sides of the first set of legs, are each driven by one of the inclined shafts 25 connected with the same shaft 22.

Each lever 34 is provided with an arm 34′ carrying an adjustable screw 39 or the like to engage the disk 31 and to press it toward a pulley 40 having a ring 41 of leather or other suitable material adapted to be engaged by said disk, which constitutes a clutch member to transmit the movement of the permanently rotating shaft 30 to said pulley 40, the latter being mounted loosely on the sleeve 31′. From the pulley 40 a belt 42 runs to a corresponding pulley 43 of a sewing machine 44 or the like. In the normal position which it takes under the influence of the spring 35, the lever 34 releases the clutch member 31 from engagement with the pulley 40, so that the latter is not driven. At the same time the pulley is engaged and stopped by a brake 45, carried by a U-shaped frame or holder 46 (secured to the lever 34) in which it is adjustable by means of a screw 47 (Fig. 3). When the corresponding pedal 38 is pressed, the brake 45 is swung off the pulley, and the latter is engaged by the clutch 31. This clutch and pulley mechanism is preferably protected by a casing 48.

The lower bearing member 28 and the parts connected therewith are preferably adjustable horizontally on the shelf 17′, toward and from the shaft 10, for which purpose the legs 17ª may be provided with transverse horizontal slots 17″ through which extend horizontal bolts 49 carried by the lower end of said bearing member 28, and the parts are locked in proper adjustment by means of nuts on said bolts. At 50 we have indicated bolts for securing to the upper ends of the legs 17ª, transverse ribs 51 on the underside of the table 52 of the sewing machines or like. The connection is so made as to allow the table to be adjusted vertically relatively to the legs, as by providing vertical slots in one of the parts, as indicated at 17ᵇ in Fig. 2.

All the parts can thus be adjusted readily to their proper positions, the rotating parts are covered, and considerable free space is given to each operator.

It will be noted particularly that the bearings of the main shaft 10 are not supported from the floor immediately below said bearings, but the floor space is unobstructed under the bearings 12, 12′. As regards certain novel features of our invention, as defined in the claims, it is immaterial whether the power-transmitting means employed embodies transverse shafts, such as 25, or whether any other well known or approved power-transmitting means is used.

Various modifications may be made without departing from the nature of our invention as defined in the appended claims.

We claim as our invention:

1. In a power-transmitter for sewing machines and the like, legs, a table supported by said legs, a main shaft extending lengthwise under said table, bearings for said shaft, transverse brackets extending inwardly from said legs above the floor and forming the sole support of said bearings, and means connected with said shaft, for operating sewing machines or the like.

2. In a power-transmitter for sewing machines and the like, legs arranged in pairs, a table supported by said legs, a main shaft extending lengthwise under the table, machine-operating shafts located adjacent to the legs of the same pair, and mechanism arranged in the same plane with the legs of said pair, for transmitting motion from said main shaft to said machine-operating shafts.

3. In a power-transmitter for sewing machines and the like, a frame, a main shaft carried thereby, a shaft extending transversely of the main shaft in skew relation thereto and operatively connected therewith, upwardly inclined shafts operatively connected with opposite ends of said transverse shaft, and machine-operating shafts actuated by the upper ends of said inclined shafts.

4. In a power-transmitter for sewing machines and the like, a frame, brackets extending toward each other from opposite sides of said frame, a carrier connected with the inner ends of companion brackets, bearings supported by said carrier, a main shaft journaled in said bearings, and machine-operating shafts driven by said main shaft.

5. In a power-transmitter for sewing machines and the like, a frame, brackets arranged in pairs and extending toward each other from opposite sides of the frame, a U-shaped carrier whose end members are connected with the inner ends of companion brackets, bearings supported by said carrier, a main shaft journaled in said bearings, a transverse shaft, driven by the main shaft, located above the latter and above said carrier, and machine-operating shafts driven by said transverse shaft.

6. In a power-transmitter for sewing machines and the like, a frame, brackets extending toward each other from opposite sides of the frame, a carrier connecting the inner ends of companion brackets, bearings adjacent to said carrier, means mounted adjustably on said carrier for engaging said bearings from below and laterally, a main shaft journaled in said bearings, and machine-operating shafts driven by said main shaft.

7. In a power-transmitter for sewing machines and the like, a frame, a main shaft carried by said frame, machine-operating shafts driven by said main shaft, and bearings for said machine-operating shafts, said bearings being adjustable transversely, toward and from the main shaft.

DANIEL BRANDENSTEIN.
JACOB FISCHER.